Aug. 6, 1940.  W. E. DUERINGER  2,210,317
INDICATING AND POSITIONING SYSTEM
Original Filed Feb. 12, 1936   4 Sheets-Sheet 1

FIG. 1

INVENTOR
Walter E. Dueringer
BY
Raymond W. Junkins
ATTORNEY

Aug. 6, 1940.　　　W. E. DUERINGER　　　2,210,317
INDICATING AND POSITIONING SYSTEM
Original Filed Feb. 12, 1936　　4 Sheets-Sheet 2

INVENTOR
WALTER E. DUERINGER
BY
Raymond W. Jenkins
ATTORNEY

Aug. 6, 1940.    W. E. DUERINGER    2,210,317
INDICATING AND POSITIONING SYSTEM
Original Filed Feb. 12, 1936    4 Sheets-Sheet 4

FIG. 6

INVENTOR
WALTER E. DUERINGER
BY
Raymond W. Junkins.
ATTORNEY

Patented Aug. 6, 1940

2,210,317

UNITED STATES PATENT OFFICE 2,210,317

INDICATING AND POSITIONING SYSTEM

Walter E. Dueringer, Shaker Heights, Ohio, assignor to Bailey Meter Company, a corporation of Delaware Application February 12, 1936, Serial No. 63,617
Renewed December 21, 1939

23 Claims. (Cl. 177—351)

The present application is a continuation-in-part of my copending application for United States Letters Patent, Serial No. 573,933, filed November 9, 1931.

This invention relates to improvements in positioning systems, and has especial reference to measuring instruments for variables, where an indication, record, or integration of the variable is desirably accomplished remotely, and where such variables may be of a physical, chemical, electrical, hydraulic or other nature. It contemplates remote synchronization of position, wherein the position of a member at one location, may be remotely reproduced. Such position of a member may be determined by the value of a variable to be remotely reproduced for indication, record, integration, use in control, etc. The position to be remotely reproduced may be a measure or indication of fluid level; or a condition such as temperature, pressure, quality or degree; or it may be merely the position of a movable object desirably remotely indicated.

In my invention I provide a system wherein it is possible to locate the indicator, recorder, register or other advising mechanism remotely from a measuring or feeling transmitting mechanism, although not necessarily so remotely. By this means the actuating members whose positions are determined responsive to that which is to be indicated, may be located in juxtaposition to apparatus or location remote from the point at which it is desired to visualize or learn such position representing a measure or indication, and kept in synchronism therewith.

One object of my invention is to provide an improved electrically actuated remote indicating or positioning system.

Another object is to provide for positioning remotely by means of a self-starting synchronous motor arranged for substantially instantaneous starting and stopping.

A further object is to provide an electrically operated positioning mechanism which may be located remotely at a considerable distance from its actuator.

Still another object is to provide a positioning system wherein an actuator remotely controls the positioning in synchronism with the actuator of a member which may be used for indicating or other purposes.

A still further object is to provide a remote recorder and indicator wherein the recording pen and the indicating pointer are positioned through the agency of a self-starting synchronous motor in synchronism with the measuring means or actuator remotely located.

With these and further objects in view, which will become apparent, I will now describe the drawings, in which.

Figure 1:
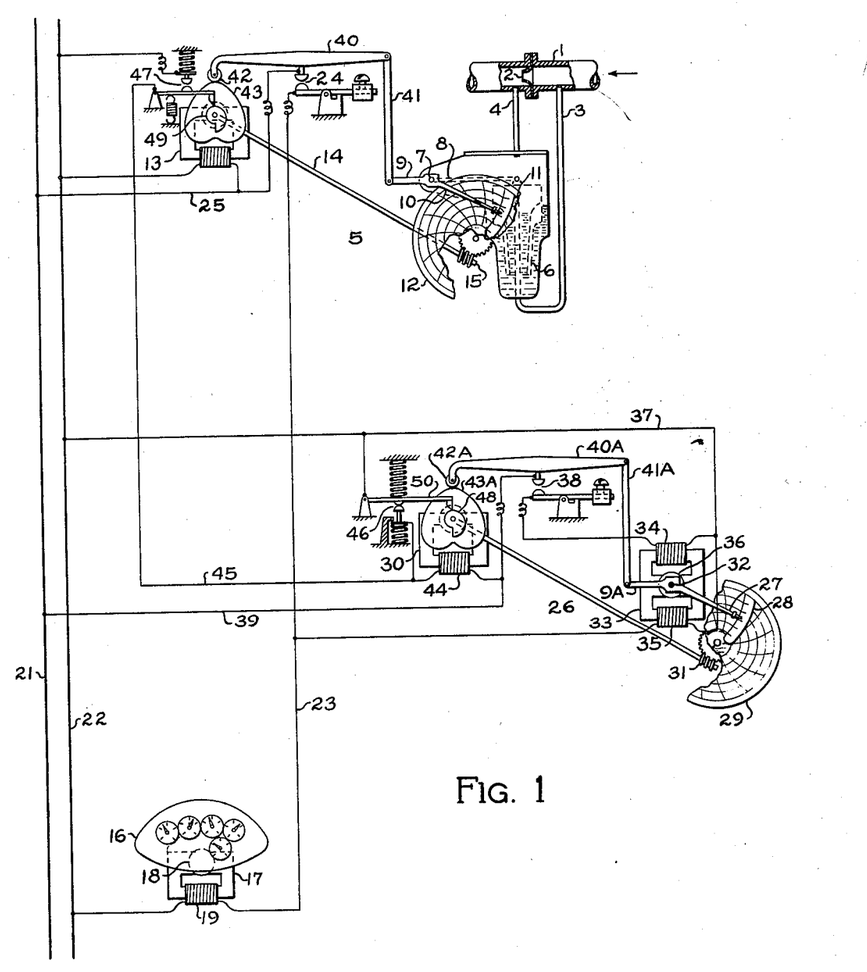
Fig. 1 represents somewhat diagrammatically a preferred embodiment of the invention.

Referring first to Fig. 1, I illustrate therein a rate of fluid flow meter with remote recording and integrating capabilities.

A variable such as the rate of flow of a fluid through a conduit 1 is desirably integrated with respect to time to give a total quantity of the fluid passing a given point during a specified interval of time such as the interval between two readings of a register. I show positioned within the conduit 1 a flow nozzle 2 forming a restriction to flow through the conduit and for creating thereby a pressure differential across the flow nozzle bearing a known relation to the rate of fluid flow therethrough. From the conduit 1 at opposite sides of the flow nozzle 2 I lead the pressure pipes 3 and 4 to a rate of flow meter indicated in general at 5.

Such a rate of flow meter may be of the liquid sealed bell type as disclosed in the patent to Ledoux, No. 1,064,748 granted June 17, 1913, wherein the bell is shaped and has walls of material thickness, to the end that the positioning of the bell is in direct proportion to the rate of fluid flow, thereby correcting for the quadratic relation which exists between rate of fluid flow through such a flow nozzle and differential pressure resulting therefrom. The bell is shown at 6 diagrammatically in dotted lines, and may be sealed by a liquid such as mercury whose approximate level within and without the bell is indicated.

The pressure within the conduit 1 ahead of the flow nozzle 2 is effective through the pipe 3 upon the interior of the bell 6, while pressure at the outlet of the flow nozzle 2 is effective through the pipe 4 upon the exterior of the bell 6, to the end that the bell is positioned vertically by the pressure differential across the flow nozzle and in linear relation to the rate of flow of the fluid.

Such vertical positioning of the bell results in an angular positioning, about a fixed fulcrum point 7, of an arm 8 for transmitting motion from the bell to the shaft of the fulcrum 7 for the positioning of an arm 9 whose function will be explained hereinafter and for positioning an indicating pen and pointer 10 cooperating with an index 11. The pen 10 is further adapted to record over a circular chart 12 which is desirably driven uniformly at a constant speed by a motor 13, illustrated as an electric motor, and drives the chart 12 through the agency of a shaft 14 and gearing 15.

In the embodiment illustrated at Fig. 1, I provide in connection with the flow meter 5, a register 16 desirably remotely located from the flow meter and having graduated dials with pointers moving in conjunction therewith for affording a continuously available means of reading the accumulated total of the rate of flow of fluid through the conduit 1. Such total flow for any desired time interval may be obtained by subtracting the reading of the dials of the register 16 at the beginning of the interval from the reading of the dials at the end of the interval, the difference between such readings representing the total flow between the beginning and the end of the interval of time, the arrangement being such that the total is the integration of the rate of flow of fluid with respect to time.

For driving the register 16 which in itself contains the necessary gear reduction between dials, I provide a self-starting single-phase synchronous motor 17 substantially independent of voltage changes and whose speed is directly and solely dependent upon the frequency of the alternating current supplied thereto.

The motor 17 has a rotor 18 comprising inherent speed reducing gears and adapted to cooperate with and drive the internal gearing of the register 16 when rotating. As illustrated, the motor has a field 19 with one connection directly to the power line 22, while a second connection is made through a conductor 23, a contact 24, and a conductor 25 to the power line 21. When the field 19 is energized through closing of the contact 24 the rotor 18 moves in a desired direction and with a corresponding actuation of the register 16 in a direction to increase the readings of the dials thereon. The arrangement described is such that the rotation of the pointers relative to the dials of the register 16 is in direct relation to the time of rotation of the rotor 18 and correspondingly to the time during which current is supplied the field coil 19, which is attained through making and breaking the contact 24.

I further provide in connection with the flow meter 5 a recording and/or indicating device 26 desirably remotely located from the flow meter 5 and from the register 16. As illustrated, an indicator arm 27 comprises a pointer cooperating with an index 28 and a pen for recording upon a circular chart 29 driven at uniform speed through the agency of a self-starting synchronous motor 30 and the gearing 31.

I cause an angular positioning of the indicator arm 27 around a fixed fulcrum shaft 32 by a synchronous electric motor 33 similar to the motor 17 and having two field coils 34, 35 for causing rotation of a rotor 36 and corresponding angular movement of the pointer 27 in one direction or the other.

One terminal of the field 35 joins the conductor 23 leading to the contact 24 while the other terminal joins the power line 22 through a conductor 37. The field 34 has one terminal connected to the conductor 37 and the other terminal leads through a contact 38 and conductor 39 to the power line 21. It will be seen, then, that energization of the field winding 34 is controlled by the contact 38, while that of the field winding 35 is controlled by the contact 24.

When both the contacts 24 and 38 are open-circuited, the fields 34 and 35 are de-energized and no rotation of the rotor 36 occurs. Likewise, when both the contacts 24 and 38 are close-circuited, both of the field windings 34 and 35 are energized and the resulting equal opposing torque results in stationary positioning of the rotor 36 and of the indicator 27. If, however, the contact 24 is close-circuited, while the contact 38 is open-circuited, or vice versa, rotation of the rotor 36 will occur in one direction or the other through the energization of the field winding 34 or the field winding 35, with corresponding lack of application to the rotor of the equal opposing torque of the field winding which is at that time not energized. Such rotation of the rotor 36 in one direction or the other will result in a positioning, through the inherent gear reduction of the rotor 36, of the indicator 27 relative to the index 28 and the recording chart 29. It will therefore be apparent that I may cause a change in the reading on the index 28 or on the recording chart 29 of the indicator pointer 27 through the relative open- or close-circuiting of the contacts 24 and 38.

I have provided a register 16 for indicating the summation or integration of variables as well as a device 26 for indicating and/or recording the instantaneous value of variables, each or both operated by electrically actuated means and which may be remotely positioned from each other and from the actuator, the interconnection therebetween comprising electric conductors. At the point which I term the actuating point, namely the meter 5, I provide a means for making and breaking circuit to the field 19 of the register 16 and to the field 35 of the device 26, arranged so that the length of time during which the circuit is broken is representative of the amount of actuation I desire to impart to the register and device remotely located. I preferably divide time into definite intervals and break the electric circuit at the actuator during each interval of time for an increment of time length determined by the value of the variable to be integrated with respect to time, in this case the rate of fluid flow through the conduit 1. However, while the increment of time is in length primarily determined by the instantaneous value of the variable at the instant of initiating the increment, nevertheless the increment length is continuously modified throughout its duration in accordance with any change in the value of the variable throughout the duration of the increment.

Certain features of the actuator mechanism are disclosed and claimed in the patent to Harvard H. Gorrie for Integrating mechanisms, Number 1,892,183, granted December 27, 1932; while certain features of the actuator and of the remotely actuated integrator are disclosed and claimed in the patent to Rew E. Woolley for Integrating mechanisms, Number 1,892,184, granted December 27, 1932, both having the same assignee as the present application.

At the fluid meter 5 and in connection with the same I provide as an actuator or transmitting element, a circuit closing arrangement of which the contact 24 controls energization of the field windings 19 and 35 in parallel. One of the contacts 24 is carried by a pivoted weighted arm limited in its travel in one direction of rotation around the pivot. The cooperating contact is carried by and intermediate the ends of a freely floating member 40 capable of being positioned along a definite path in a single plane in space wherein a certain percentage of the travel in said path causes engagement and closure of the contact 24. The member 40 is pivotally connected at one end through a rod 41 to the arm 9 of the flow meter 5. The arrangement (on the drawings) is such that when there is zero fluid flow through the conduit 1, the bell 6 will be in its lowermost position and the righthand end of the member 40 in its uppermost position of travel. Conversely, when fluid flow through the conduit 1 is at 100% of capacity, the bell 6 will be in its uppermost travel position and the righthand end of the member 40 in its lowermost travel position. The righthand end of the member 40 thus traverses a predetermined path in a single plane in space.

The opposite end of the member 40 carries a roller 42 which by gravity bears against the surface of a cam 43 in a manner such that it is continually reciprocated, at a substantially uniform speed, between definite limits of travel, through rotation of the cam 43 driven at a uniform speed by the motor 13. The chart 12, for example, may be arranged to make one revolution in 24 hours, while the speed of the cam 43 might be in the nature of one revolution in 10 seconds. It will be seen, then, that the member 40 is arranged for positioning along a definite path within limits of travel in a single plane in space, such that movement of the member is angularly about either end by the positioning of the opposite end between definite limits of travel. The contact point carried by the member 40 is then positioned along a definite path in dependence upon the rate of fluid flow and upon a definite time reciprocation.

In the illustration, the roller 42 is at its uppermost travel limit, whereas the rate of fluid flow is indicated at approximately 50% of travel. When the rate of flow is zero and the righthand end of the member 40 at its uppermost position, then the reciprocation of the contact carried by the member 40, through reciprocation of the roller 42, will not cause closure of the contacts 24. However, when rate of fluid flow is maximum and the righthand end of the member 40 is at its lowermost position, then time reciprocation of the roller 42 causes closure of the contacts 24 throughout the entire or major portion of the reciprocation and consequent maximum actuation of the register 16, integrating the maximum fluid flow for which the system is designed.

Simultaneously, the maximum engagement of the contacts 24, for each time period representative of maximum rate of fluid flow will cause a maximum time energization of the field 35 for rotation of the rotor 36 in a direction tending to move the pointer 27 upward relative to the index 28 and outward relative to the chart 29 to indicate on the index and chart the maximum rate of fluid flow through the conduit.

Correspondingly, different percentages of maximum rate of fluid flow will cause integration on the register 16 at a uniform rate, but for a percentage of each predetermined time interval, depending upon the percentage of maximum rate of flow; and simultaneously, an energization of the field winding 35 for percentages of each predetermined time interval depending upon the rate of fluid flow.

It will be seen that, were the field winding 35 only effective upon the rotor 36, the movement of the indicator 27 would always be in the same direction, which would cause it very shortly to reach a maximum position of travel. I therefore provide the field winding 34 adapted for causing the rotor 36 to move in the opposite direction so that the indicator 27 may be moved in either direction and find a position corresponding to the position of the indicator arm 10 with which it is desirably to be synchronized.

I have duplicated in the device 26, the freely floating member 40 of the flow meter 5 as indicated at 40A. I indicate at 41A a rod connecting the righthand end of the member 40A with an arm 9A positioned by the rotor 36 simultaneously with the indicator 27. Thus the righthand end of the freely floating member 40A is positioned between definite limits of travel along a predetermined path in a single plane of space, the limits of travel corresponding to maximum and minimum position of the indicator 27. The lefthand end of the floating member 40A is reciprocated by a roller 42A carried by and on a cam 43A which is continuously rotated at a uniform speed by the motor 30.

The contact 38, as previously mentioned, is inserted between the conductor 39 and the field winding 34 to control the energization of same, and is adapted to be open- or close-circuited through reciprocation or position of the floating member 40A. The arrangement described is similar to, or duplicates, that of the meter 5, and is such that if the indicator 10 and the indicator 27 are in synchronism and the two cams 43 and 43A are in synchronism, then the contacts 24 and 38 will be simultaneously closed and opened throughout varying percentages of the time cycle of the cam, depending upon the value of the variable, in this case rate of fluid flow, which in addition to time is positioning the floating members 40 and 40A. If, however, and still assuming that the cams 43 and 43A remain in synchronism, the righthand end of the member 40 is positioned to a different position than the righthand end of the member 40A, then either the field winding 34 or 35 will be energized alone for a portion of each time period, and cause a movement of the indicator 27 comprising a follow-up movement of the contact 38.

It will be seen in operation that if the rate of fluid flow through the conduit 1 increases, then the righthand end of the member 40 will be lowered an amount proportional to the increased rate of flow and correspondingly the contact 24 will be close-circuited for a longer percentage of the time period of revolution of the cam 43 than is the contact 38 for the same time period of rotation of the cam 43A, so that the field winding 35 will be energized alone for a time increment of the difference between the time of engagement of the contact 24 and that of the contact 38, whereby the pointer 27 will be moved upwardly on the chart 29 an amount proportional to such difference in time. Such movement of the indicator 27 will cause a change in the position of the righthand end of the floating member 40A and depending upon the magnitude of the change in the rate of fluid flow, then either in a single or in several revolutions of the time cams 43 and 43A, will be accomplished a synchronizing of the members 40 and 40A as well as the indicators 10 and 27. This will be understood, for in the example given, if the time of closure of the contact 24 is greater than that of the contact 38, whereby the field winding 35 is energized to cause an upward movement of the indicator 27, such upward movement will cause a downward movement of the righthand end of the member 40A whereby upon the next revolution of the cams 43, 43A, the contact 38 will be close-circuited for a greater length of time than previously, and such adjustment of the time closure of the contact 38 will continue until it is equal to the time closure of the contact 24.

If in operation the rate of flow of fluid decreases from that previously, then correspondingly the time of closure of the contacts 24 will be less than before, and the difference between the time of closure of the contact 24 and that of the contact 38 will be in the direction favoring the contact 38 to the extent that the contact 38 will have been closed a small time increment beyond that equal to the time of closure of the contact 24, whereby the field winding 34 will be energized alone for a short increment of time to cause movement of the pointer 27 downwardly and correspondingly of the righthand end of the member 40A upwardly until again the contacts 24 and 38 are closed for equal time lengths.

With the mechanism and system so far described, the register 16 accomplishes a summation or integration with respect to time of the rate of fluid flow indicated and recorded on the meter 5, while the remote measuring device 26 causes an indication and/or recording wherein the pointer 27 is moved in synchronism with the pointer 10 of the transmitting actuator 5. Such synchronization between the position of the indicator 27 and the indicator 10 is based primarily, of course, upon proper relative design of dimensions, speed, gear ratios, etc., as well as upon the keeping in synchronism of the motors 13 and 30. Although I have shown the motors 13 and 30 as connected across the same source of alternating current power 21, 22, wherein the similar motors will operate in synchronism as will the cams 43 and 43A, I further provide means for checking such synchronism, and if for some reason such as the momentary or prolonged stoppage of power to one of the motors, for example the motor 30, I correct for such lack of movement of the motor 30 as may have been caused by such a failure of power, to result in a re-synchronizing of the cams 43, 43A.

The motor 13 is connected directly to the power lines 21, 22. One terminal of the field winding 44 of the motor 30 is connected through the conductor 39 to the power line 21, whereas the other terminal is connected in parallel through a conductor 45 to a normally close circuited contact 46 and a normally open circuited contact 47. By normally so, I mean that when normal operation occurs, with the motors 13 and 30 in synchronism, the contact 46 will be close-circuited, while the contact 47 will be open-circuited, and vice versa. The opening and closing of the said contacts 46, 47 is controlled by cams 48, 49 respectively, driven at a uniform speed by the motors 30, 13, simultaneously with the cams 43A, 43.

One of the contacts 46 is spring urged normally against a stop providing an upper limit of travel. The mating contact 46 comprises an arm 50, spring urged to mate with the first-named contact, pivoted at one end and carrying at its opposite end a nose adapted to ride on and engage the cam 48; the arrangement being such that the contacts 46 are close-circuited, except during a portion of the revolution of the cam 48 through which a high part of the cam acting upon the nose of the arm 50 moves the contact carried thereby away from its mating contact to open-circuit position.

The arrangement of the contacts 47 is similar, both contacts being spring urged separately, and in directions such that they are close-circuited only during that part of the rotation of the cam 49 corresponding to the open-circuited position of the contacts 46. The arrangement of both sets of contacts is such that when the motors 13 and 30 are in synchronism, then for a portion of the revolution of the two motors, the contact 46 is closed while the contact 47 is opened, and vice versa.

It will be seen that with such arrangement and normally so, the motor 30 is in continual rotation, for during one-half of the cycle of rotation of the cam 48 the contact 46 is closed, thus energizing the field winding 44, while during the alternate half revolution of the cam 48, the cam 49 of the motor 13 causes a closure of the contact 47 energizing the field winding 44 in parallel with the contact 46 which is at that time open-circuited, thus resulting in a continual rotation of the motor 30.

If, however, the power line to the motor 30 is momentarily de-energized, causing the motor to stop, then when power is again available at the motor 30, the staggering by half-cycles of the cam 48 and the cam 49 will not be exact, as previously, and rotation of the motor 30 will pause for a short interval during each cycle of rotation of the cam 49, until it again gets in step with the motor 13. The number of revolutions of the cam 49 which will occur before this resynchronizing is accomplished depends upon how far out of synchronism the cams 48 and 49 are at the time power is again made available for the field winding 44.

Figure 2:
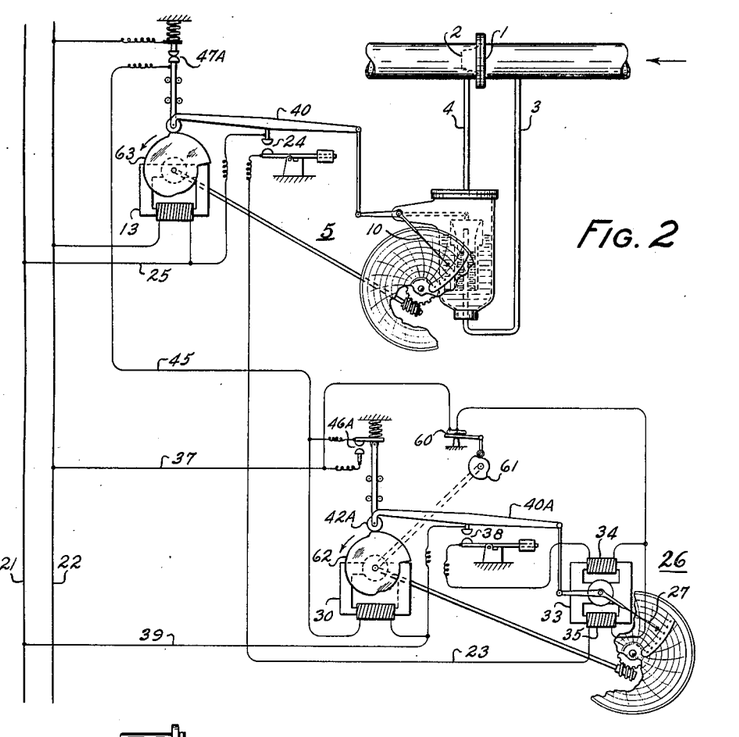
Fig. 2 is similar to Fig. 1 with some modification.

The general layout of Fig. 2 is similar to that of Fig. 1. A transmitting flow meter 5 has an indicating and recording pen 10, and is adapted to remotely actuate, and position in synchronism therewith, an indicator pen 27 at the receiver 26. Fig. 2, however, differs in several important ways from Fig. 1.

A mercury switch 60 is provided, inserted in the conductor 37, so that during the synchronizing portion of the cycle of operation the positioning motor 33 is deenergized. It will be observed that the mercury switch 60 is adapted to be tilted to either of two positions by a cam 61 driven at a uniform speed by the motor 30. Through 180 degrees of the cam rotation the mercury switch closes circuit to the neutral connection of the motor 33, and through the alternate 180 degrees the mercury switch 60 is open-circuited.

The switch 60 not only assures that the motor 33 will not be operated, during the synchronizing portion, but also that it will always be de-energized and stop its rotation at a predetermined point in the cycle of operation of the motor 30 and the cam 62 positioned thereby.

A second feature is the double usage of a cam, such as the cam 62, for both positioning and synchronizing. Referring back to Fig. 1 it will be observed that the motor 13 drives a positioning cam 43 and a synchronizing cam 49. The motor 30 drives a positioning cam 34A and a synchronizing cam 48. In Fig. 2 the motor 30 drives a cam 62 which combines the function of the positioning and synchronizing cams 43A, 48, and the motor 13 drives a cam 63 combining the functions of the positioning cam 43 and the synchronizing cam 49.

Referring particularly to the cam 62, it will be observed that a uniform rise portion occupies approximately 180 degrees of the contour (at the left on the drawing). There is approximately 90 degrees (to the lower right) of circular contour depressed below the innermost end of the uniform rise section. There is approximately 90 degrees (at the upper right) of circular contour, raised above the highest point of the uniform rise portion. The direction of rotation of the cam is counter-clockwise and the roller 42A has just left the highest part of the uniform rise portion and is beginning its travel over the synchronizing portion.

The apparatus has just entered the synchronizing portion of the cycle. The mercury switch 60 has broken the neutral to the motor 33. The roller 42A on the high part of the cam 62 has caused an opening of the synchronizing contacts 46A at the receiver, while the synchronizing contacts 47A at the sender have just been closed.

Throughout the uniform rise positioning portion of the contour of the cams 62, 63 and additionally throughout the lowermost circular contour of the cams, the contacts 47A will be normally open-circuited and the contacts 46A will be normally close-circuited. Throughout that portion of the cam known as the synchronizing portion the reverse status of the contacts 46A, 47A is attained (the condition illustrated in Fig. 2).

The relative proportioning of the contour of the cam between the positioning and synchronizing contours is a matter of design and may vary with different conditions. It is, however, to be observed that through a portion of the rotation of the cams 62, 63, the cams are used in a positioning manner, whereas throughout another portion they are used as synchronizing cams.

Figure 3:
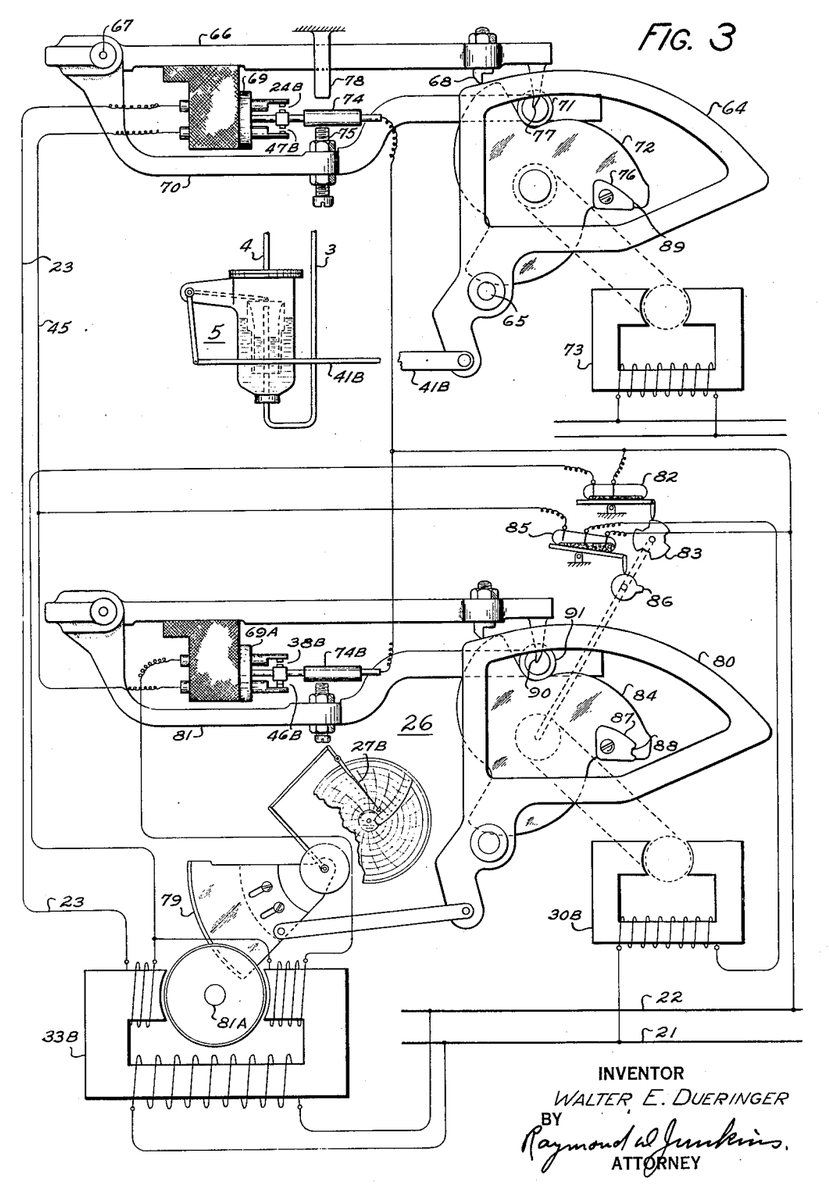
Fig. 3 illustrates a second embodiment of my invention.

Fig. 3 illustrates a further embodiment of the invention. The rate of flow meter 5 positions a link 41B to angularly move a cam 64 around a fixed pivot 65. The contour of the cam 64 may be such as to correct for angularity, other variables, or may incorporate the square root functional relation between flow and differential pressure. A contact carrying beam 66 is pivotally fastened at one end to a pivot 67 and at the other end has a projection 68 adapted to engage the surface or contour of the cam 64. Thus the contact assembly 69 is continually positioned, relative to the pivot 67, according to the variable, which in this case is rate of fluid flow.

A second beam 70 is pivoted at one end to the fixed pivot 67 and at the other end carries a roller 71 riding on the contour of a three-lobe cam 72, which latter is continually rotated at a substantially uniform speed by the synchronous motor 73.

The contact assembly 69 has a normally open synchronizing contact 47B, while the contact assembly 69A of the receiver has a normally closed synchronizing contact 46B. The transmitter has a normally open positioning contact 24B, while the receiver has a normally open positioning contact 38B.

It will be observed that the contact assembly 69 is positioned around the pivot 67 in accordance with the position of the cam 64 (the value of the variable), while the beam 70 is continually reciprocated, relative to the beam 66, by the continually rotated cam 72. During a portion of each rotation of the cam 72, and for each lobe of the cam, the adjustable stop 75 may engage the neutral member 74 and cause a closure of the contact 24B for a period of time dependent upon the value of the variable (rate of flow). The present embodiment provides for three closures of the contacts 24B during each revolution of the cam 72. It is apparent that the cam 72 may have a more or less number of lobes as dictated by the individual design.

On the side of the cam 72 I illustrate a projection 76 adapted to engage the projection 77 carried by the beam 66. Thus once for each revolution of the cam 72 the beam 66 is angularly positioned in a counter-clockwise manner to an extent whereby the element 74 engages the fixed stop 78, causing a closure of the normally open synchronizing contacts 47B.

Closure of the contacts 24B causes the motor 33B to rotate in one direction, while closure of the contacts 38B causes the motor 33B to rotate in the other direction. Rotation of the motor 33B in one direction or the other positions the indicating pen 27B of the receiver 26, and at the same time, through a friction driving device 79 the motor 33B positions the cam 80.

Figure 4:
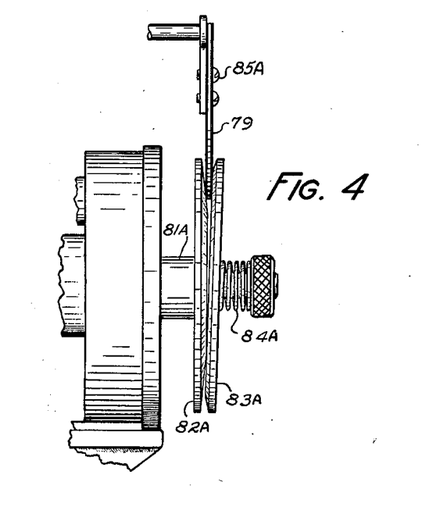
Fig. 4 is a detail to enlarged scale of a friction motion transmitting device.

The friction drive 79 is shown in greater detail at Fig. 4 and comprises a shaft 81A to which is fixed a friction plate 82A. A mating friction plate 83A is held in contact with the plate 82A through the force of a spring 84A. A sector 79 is frictionally engaged between the plates 82A, 83A and angularly moved thereby. The adjustment 85A provides for varying the radius of the sector 79 and thereby its speed of angular motion.

Figure 5:
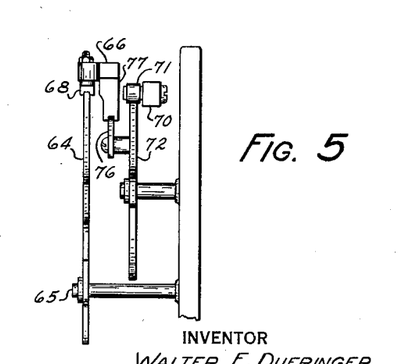
Fig. 5 is an end elevation of a part of Fig. 3.

At Fig. 5 I illustrate an end view of a part of the transmitter of Fig. 3 showing the relative arrangement of the beams 66, 70; the projections 68, 71, 77 carried thereby; and the cams 64, 72.

The motor 33B is of a type wherein when one of the opposed pole windings is short-circuited the motor rotates in one direction, when the other opposed pole winding is short-circuited the motor rotates in the reverse direction, and if both opposed windings are energized simultaneously the motor does not rotate. This latter condition occurs when the contacts 24B, 38B are both close-circuited by upward movement of the arms 70, 81 in synchronism.

A mercury switch 82 is connected in the neutral of the opposed windings of the motor 33B and is periodically opened and closed by the motor 30B in step with the three-lobe cam 84. During the rising portion of each lobe closure of the contacts 24B, 38B short circuits the opposed windings of the motor 33B. During the fall of the cams neither of the opposed windings can be energized as the switch 82 will be tilted to hold the neutral of the opposed windings open.

When the switch 82 is opened during the fall of the cam on two lobes no other operation takes place, the entire mechanism simply remaining in status quo. Passing over the tip of the third lobe, as at 76, the synchronizing operation is performed. At this time as soon as the mercury switch 82 has opened a switch 85 is arranged to tilt so that the motor 30B must be energised either through the contacts 47B or 46B.

As shown in Fig. 3 the switch 85 connects the motor 30B directly to the power source 22. When the motor 30B has caused the cam 86 to come to a position wherein the mercury switch 85 is tilted to its other position, then the motor 30B can be energized only through the synchronizing contacts 46B, 47B. There is sufficient mercury in the switch 85 so that at an intermediate position all three of the contacts are contacted by mercury, and thus, assuming that either the contact 46B or the contact 47B is closed, there will never be a time, during actuation of the switch 85, when the motor 30B is not energized.

The cam 84 carries a projection 87 somewhat similar in shape to the projection 76 on the cam 72, except that it has at its tip a depression 88. This corresponds substantially to the tip 89 of the portion 76. If the two mechanisms are in synchronism then the element 77 rides across the tip 89, while the element 90 rides through the depression 88.

Consider the operation of the system from the position shown in Fig. 3. Rotation of the cams 72, 84 is counter-clockwise. The rollers 71, 91 ride up the incline of the cams 72, 84 and cause a close-circuiting of the contacts 24B, 38B for a period of time dependent upon the then rate of flow. The motor 33B is not energized as it is now assumed that the recording pens of the transmitter and the receiver are reading alike.

As the raised portion on the end of the lobe of each of the cams 72, 84 comes under the rollers 71, 91, respectively, the mechanisms are positioned definitely in preparation for the synchronizing action. During the time that the contacts 24B, 38B have been closed, the contact 46B as well as the contact 47B are open-circuited.

The element 77 now begins to ride up the cam surface 76 while the element 90 begins to ride up the cam surface 87. The mercury switch 85 is being tilted by the cam 86. The contact 46B is normally biased to close circuit position so that when the highest part of the cam 87 is reached by the element 90 the contact 46B momentarily closes, while the contact 47B is still open. At this time the mercury switch 85 has closed circuit so that the motor 30B is completely under the control of the contacts 46B, 47B.

Immediately later the tip 77 reaches the highest point 89 of the cam 76 while the tip 90 falls into the depression 88. At the instant this occurs the contact 47B is closed and the contact 46B is opened and if the two cams 72, 84 are not in exact synchronism the motor 30B will immediately stop, leaving the tip 90 in the depression 88, because if the two cams are not in exact synchronism the contact 47B would not have been closed at the proper instant to maintain the motor 30B in continued operation.

Assuming that the cams 72, 84 are in exact synchronism, then the motor 30B continues to operate and the tip 90 immediately passes out of the depression 88 to another high point on the cam 87 in which the contact 46B is closed and the motor 30B has not failed to rotate during the synchronizing action. The mercury switch 85 returns to its original position and the remainder of the complete revolution of the cam 84 is accomplished.

If, however, the two cams were not in synchronism and the motor 30B stopped, leaving the tip 90 in the depression 88, then it would so stay until the next revolution of the cam 72 brought the tip 89 around again and at the instant its location relative to the location of the depression 88 was proper, the motor 30B would start up and the two would continue then in synchronism.

Figure 6:
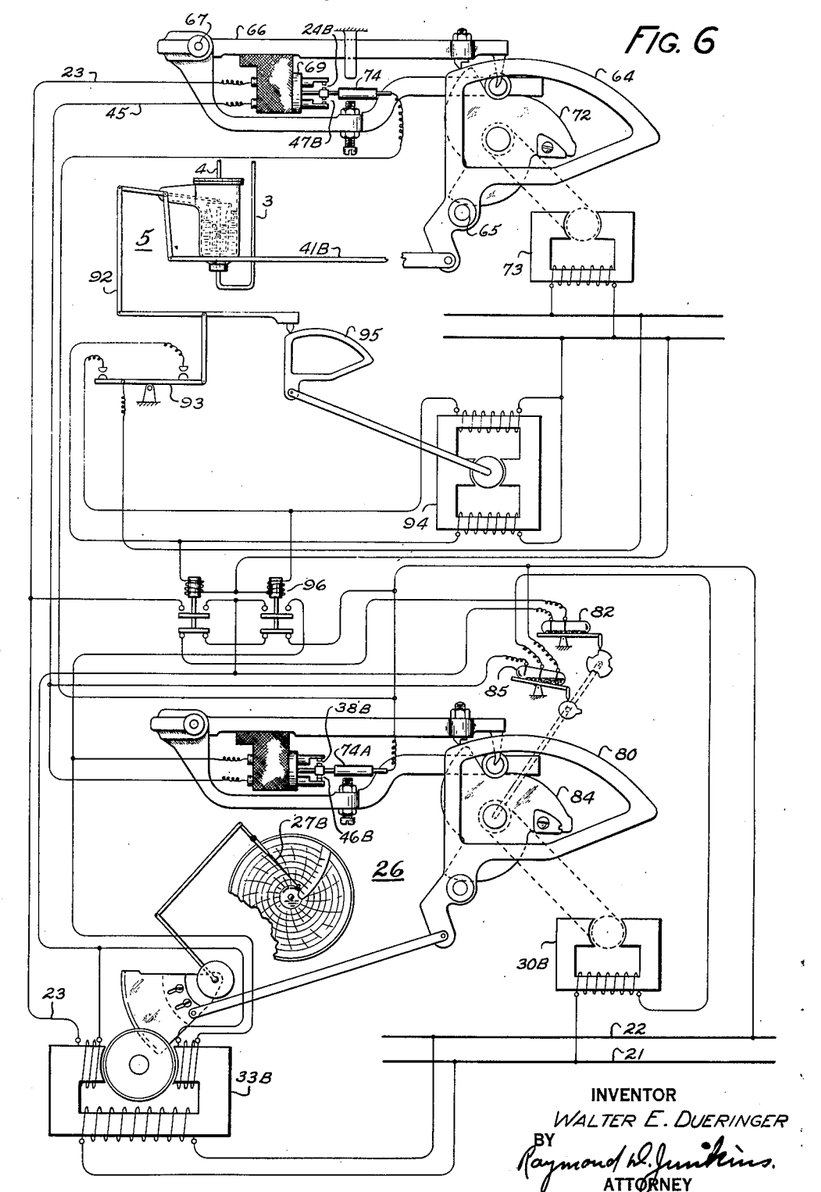
Fig. 6 illustrates a further embodiment of the invention.

Fig. 6 is basically similar to the arrangement of Fig. 3 but additionally shows the feature of a substantially instantaneous positioning of the pen 27B to a new corresponding position when the pen of the flow meter 5 changes its position. The meter 5, in addition to positioning the arm 41B, positions a link 92 for positioning a contact bar 93 around a fixed pivot.

Assume that there is an increase in rate of flow at the meter 5. The link 92 is lowered, the contact bar 93 is positioned in a clockwise direction, and the lefthand contacts thereof are close-circuited. This energizes a motor 94 for rotation in proper direction to position a cam 95 in proper direction and amount until the lefthand contacts of the bar 93 are again open-circuited.

Simultaneously the closing of the lefthand contacts of the bar 93 energizes a relay 96 to actuate the motor 33B in proper direction to position the cam 80 and the pen 27B, into agreement with the recording pen of the meter 5 and the cam 64.

If exact agreement is not attained at this high speed motion, the follow-up action through rotation of the cams 72, 84, and action of contacts 24B, 38B, will follow up to bring about exact agreement.

The result is an initial high speed positioning of the receiver into substantial agreement with the transmitter, followed up by incremental readjustments as might be necessary to accomplish the exact agreement. The synchronizing of the cams is accomplished as has been described for Fig. 3.

It will be appreciated that the motors 73, 30B, etc., are illustrated merely diagrammatically and that the necessary speed reduction gearing is provided between the motors themselves and the various shafts or parts which they must drive at reduced speed. It is not felt necessary to illustrate such gear reductions in detail as they are common and well known expedients.

While I have illustrated and described a preferred embodiment of my invention in connection with the remote positioning or indicating of the flow of a fluid, the invention is by no means limited thereto, and may be used for remote synchronizing of position or indication of any variable or constant desirably remotely kept in step with a sender or actuator in itself representing a position.

It is not necessary that the exact mechanical and electrical arrangement shown be carried out, for I contemplate broadly a system whereby I may remotely indicate, record, integrate or otherwise show or advise an observer at a remote point the position of a member actuated in any desired manner.

I desire it to be understood that I am not to be limited by the embodiment shown, but only as to the claims in view of prior art.

What I claim as new and desire to secure by Letters Patent of the United States, is:

1. In a measuring device, in combination, a plurality of moving members, a self-starting synchronous electric motor for each of said members for synchronous effecting periodic operation of said members through predetermined cyclic courses, an electro-responsive device having opposed fields, one of said fields normally under the control of one of said members, the other of said fields normally under the control of the other of said members, means under the control of one of said driving means for rendering said members ineffective to control said electro-responsive device during a portion of each cycle, and means for maintaining said synchronous motors in proper phase relationship actuated during said portion of each cycle comprising, means actuated by one of said synchronous motors for interrupting the current supply thereto for a predetermined increment of time, means actuated by the other of said synchronous motors for energizing said one of said synchronous motors for a like increment of time whereby if said motors are in proper phase relationship said means are actuated concurrently and said one of said synchronous motors is continuously energized.

2. In a measuring device, in combination, a motor, a movable member, a driving motor, a source of current for energizing said driving motor, a cam rotated by said motor for periodically operating said member through a predetermined cyclic course, contact means under the control of said member for controlling operation of said first motor, a switch under the control of said driving motor for rendering said contact ineffective to control said first motor during a portion of said cycle, and a second switch under the control of said driving motor for placing said driving motor under the control of said movable member during a part of said portion.

3. In a measuring device, in combination, a motor having opposed windings, a movable member, a driving motor, a source of current for energizing said driving motor, a cam rotated by the driving motor for periodically operating said member through a predetermined cyclic course, a second movable member, a second driving motor, a second cam rotated by the second driving motor for periodically operating said member through a predetermined cyclic course, a first contact means under the control of said first member for controlling operation of one of said opposed windings, a second contact means under the control of said second member for controlling operation of the other of said opposed windings, a switch under the control of said first driving motor for rendering said first and second contact means ineffective to control said opposed windings during a portion of each revolution of said driving motors, a normally closed third switch connected in circuit between said source and first driving motor, a normally open fourth switch connected in circuit between said source and first driving motor, means for opening said third switch for a predetermined angular movement of said first cam during the portion of the revolution of the driving motors when said contact means are ineffective to control said opposed windings, and means for closing said fourth switch for substantially the same angular movement of said second cam, whereby if said cams are in proper phase relationship said first driving motor is continuously energized and if not in proper phase relationship such relationship restored through deenergization of said first driving motor.

4. In a measuring device, in combination, a pair of constantly rotating cams, a driving motor for each of said cams, a reversible motor having opposed windings, means under the control of said cams for controlling the operation of said reversible motor during a portion of each revolution, and means for placing one of said driving motors under the control of said cams for a part of the remainder of each revolution to maintain proper phase relationship between said cams.

5. In a measuring device, in combination, a pair of rotatable cams having similar contours, a driving motor for rotating each of said cams, a reversible motor having opposed windings, means under the control of said cams for controlling the operation of said reversible motor during a portion of each revolution, a source of current, a normally closed switch and a normally open switch connected in parallel between said source and one of said driving motors, means under the control of one of said cams for opening said normally closed switch for an angular increment of the remainder of each revolution; and means under the control of the other of said cams for closing said normally open switch for substantially the same angular increment, whereby if said cams are in proper phase relationship said first driving motor is continuously energized and if not in proper phase relationship such relationship restored through deenergization of said first driving motor.

6. In a measuring device, in combination, a member movable from a neutral position in accordance with changes in the magnitude of a variable, a reversible motor, contact means under the control of said member for controlling energization of said reversible motor to restore said member to the neutral position after departure therefrom, a second reversible motor having opposed windings under the control of said contact means, and means also controlling said second reversible motor comprising a first switch controlling one of said windings positioned in accordance with changes in the magnitude of the variable, a feeler for periodically operating said switch for increments of time proportional to the magnitude of the variable, a second switch adapted to control the opposed winding of said second reversible motor, a feeler for periodically operating said switch for increments of time proportional to the position of said second reversible motor, and means for giving precedence to the control of said second reversible motor by said contact means.

7. In a telemeter for remotely indicating the magnitude of a variable, in combination, a transmitter for establishing electrical impulses corresponding in time duration with changes in the magnitude of the variable and other electrical impulses, corresponding in time duration with the magnitude of the variable, and a receiver responsive to said impulses.

8. In a telemeter for remotely indicating the magnitude of a variable, in combination, a transmitter comprising means for establishing electrical impulses having a characteristic varying in accordance with changes in the magnitude of the variable and means for periodically establishing electrical impulses having a characteristic varying in accordance with the magnitude of the variable, a receiver responsive to said impulses and means giving precedence to said first named impulses over said periodic impulses.

9. In a telemeter for remotely indicating the magnitude of a variable, in combination, a transmitter comprising means for establishing electrical impulses of a time duration varying in accordance with changes in the magnitude of the variable and means for periodically establishing electrical impulses of a time duration varying in accordance with the magnitude of the variable, a receiver comprising a movable exhibiting member, means for periodically establishing electrical impulses of a time duration varying in accordance with the position of said member; and means for positioning said movable member by an amount proportional to the time duration of said first named impulses and by the difference in time duration between said second and third named impulses.

10. In a telemeter for remotely indicating the magnitude of a variable, in combination, a pair of continuously operating motors, a cam rotated by each of said motors, contact means under the control of said cams for controlling the energization of one of said motors, a reversible motor having opposed windings, and contact means under the control of said cams for controlling the energization of said opposed windings.

11. In a telemeter for remotely indicating the magnitude of a variable, in combination, a transmitter comprising a member normally positioned in accordance with the magnitude of the variable, a feeler for periodically determining the position of said member, a cam for operating said feeler, a driving motor for said cam, contact means under the control of said member and feeler for periodically establishing an electric circuit in accordance with the magnitude of the variable, a receiver comprising a positioning reversible motor having opposed windings, one of said windings connected in circuit with said first named contact means, a second movable member positioned by said motor, a second feeler for periodically determining the position of said second member, a second cam for operating said feeler, a second driving motor for said cam, a second contact means under the control of said second member and feeler for periodically establishing a second electric circuit in accordance with the position of said second member, the other of said opposed windings connected in circuit with said second contact means; means for de-energizing said first and second circuits at a predetermined position of one of said feelers, and means for causing said electric circuits to be established in proper phase relation whereby said positioning motor is periodically operated in one direction in accordance with the difference in length of time said first and second circuits are established, comprising means for periodically placing said second driving motor under the control of said first and second contact means, means under the control of said cams for periodically moving their cooperating members to predetermined positions, means for producing relative movement between said second motor and feeler to break the electric circuit through said second driving motor for an increment of time, means for producing relative movement between said first member and feeler to establish a circuit through said second driving motor for an increment of time of substantially the same length, whereby if said cams are in proper phase said second motor is continuously energized.

12. A telemetric system comprising a first transmitting means for cyclically telemetering signals of a duration corresponding with a variable quantity, a second transmitting means operated in synchronism with said first transmitting means for cyclically telemetering signals of a duration corresponding with a second variable quantity, receiving means under the joint control of said signals, means for rendering said receiving means inoperative during a portion of the cycle of operation of said transmitting means, and means for testing the phase relationship between said cyclically operable transmitting means during the portion of the cycle when said receiving means is inoperative.

13. A telemetric system comprising a first transmitting means for cyclically telemetering signals of a duration corresponding with a variable quantity, a second transmitting means operated in synchronism with said first transmitting means for cyclically telemetering signals of a duration corresponding with a second variable quantity, receiving means under the joint control of said signals, means for rendering said receiving means inoperative during a portion of each cycle of operation of said transmitting means, and means responsive to departure from a predetermined phase relationship between said transmitting means for restoring said predetermined phase relationship during the portion of said cycle when said receiving means is inoperative.

14. A telemetric system comprising a first transmitting means for cyclically telemetering signals of a duration corresponding with a variable quantity, a second transmitting means operated in synchronism with said first transmitting means for cyclically telemetering signals of a duration corresponding with a second variable quantity, receiving means under the joint control of said transmitting means, means for testing the phase relationship between said transmitting means during each cycle of operation, and means for inhibiting operation of said receiving means during the portion of the cycle when said phase relationship is being tested.

15. A telemetric system comprising a first transmitting means for cyclically telemetering signals of a duration corresponding with a variable quantity, a second transmitting means operated in synchronism with said first transmitting means for cyclically telemetering signals of a duration corresponding with a second variable quantity, receiving means under the joint control of said impulses, means for determining the phase relationship between said cyclically operated means during a portion of each cycle of operation of one of said transmitting means, means under the control of said last named means for stopping one of said cyclically operable means if a predetermined phase relationship does not exist between said transmitting means, and means for rendering said receiving means inoperative when said one of said transmitting means is stopped.

16. In a telemetric system having a plurality of cyclically operable means each producing a periodic signal of a time duration corresponding to a variable, and receiver means responsive to said signals, means under the joint control of all of said cyclically operable means for temporarily varying the relative speeds of said cyclically operable means to maintain a predetermined phase relationship between all of said cyclically operable means, and means for rendering said receiving means inoperative while the relative speeds of said cyclically operable means is temporarily varied.

17. In a telemetric system having a plurality of cyclically operable means, each adapted to produce a signal during each cycle of operation corresponding to a variable and receiver means responsive to said signals; means for driving all of said cyclically operable means in synchronism, means for temporarily varying the speed of one of said cyclically operable means to maintain uniformity of motion between said cyclically operable means throughout each cycle of operation, and means for rendering said receiver means unresponsive to said signals while the speed of said one of said cyclically operable means is temporarily varied.

18. In a telemetric system of the type wherein a plurality of cams are driven through a series of successive cycles to produce signals during a portion of each cycle of operation corresponding in duration to the magnitude of a variable; self-starting synchronous motor means for driving said cams and means for maintaining said cams in predetermined phase relationship comprising circuit controlling means actuated by all of said cams during a part of the remainder of each revolution for controlling the operation of one of said motor means.

19. In a telemetric system having a plurality of transmitters each adapted to periodically propagate signals of a time duration proportional to a variable and receiver means responsive to said signals, means including a cam in each of said transmitting stations for propagating said signals and means including each of said cams for maintaining a predetermined phase relationship between said cams whereby all of said first named signals occur during the same portion of each cycle of operation.

20. In a telemetric system, in combination, a plurality of movable members, means including a cam for effecting periodic synchronous reciprocation of each of said members, an electro-responsive device having opposed windings, each of said windings controlled by one of said members, means rendering said members ineffective to control said electro-responsive device during a portion of each reciprocation, and means actuated by each of said cams during said portion for controlling the speed of one of said cams to maintain the reciprocations of all of said members in phase.

21. In a telemetric system, a transmitter, a receiver, and a circuit connecting said transmitter with said receiver, said transmitter comprising means for cyclically producing signals in said circuit of a time duration corresponding to the magnitude of a variable and means for producing signals in said circuit corresponding in time duration to the magnitude of changes in said variable; and said receiver comprising means responsive to said signals.

22. In a telemeter for remotely indicating the magnitude of a variable, in combination, a transmitter comprising means for establishing electric impulses having a characteristic varying in correspondence with changes in the magnitude of a variable, and means for periodically establishing electric impulses having a characteristic varying in correspondence with the magnitude of the variable; and a receiver responsive to said impulses.

23. In a telemetric system, in combination, a transmitter comprising means for establishing electric impulses having a characteristic varying in correspondence with changes in the magnitude of a variable, and means for periodically establishing electric impulses having a characteristic varying in correspondence with the magnitude of the variable; and receiving means responsive to said impulses.

WALTER E. DUERINGER.